United States Patent [19]

Humphrey et al.

[11] 4,172,786
[45] Oct. 30, 1979

[54] OZONATION OF COOLING TOWER WATERS

[76] Inventors: Robert A. Frosch, Administrator of the National Aeronautics and Space Administration, with respect to an invention of Marshall F. Humphrey, Duarte; Kenneth R. French, La Canada; Ronald D. Howe, Sierra Madre, all of Calif.

[21] Appl. No.: 946,992

[22] Filed: Sep. 29, 1978

[51] Int. Cl.[2] .............................................. C02B 5/02
[52] U.S. Cl. ................................... 210/57; 210/63 Z; 422/9
[58] Field of Search ................... 210/57, 58, 63 Z, 50, 210/59, 61; 422/9

[56] References Cited
U.S. PATENT DOCUMENTS

| 1,103,211 | 7/1914 | Knips | 422/9 |
| 4,098,691 | 7/1978 | Filby | 210/63 Z |

FOREIGN PATENT DOCUMENTS 2500947  7/1976  Fed. Rep. of Germany ........ 210/63 Z Primary Examiner—Thomas G. Wyse
Attorney, Agent, or Firm—Monte F. Mott; John R. Manning; Wilfred Grifka

[57] ABSTRACT

Continuous ozone injection into water circulating between a cooling tower and heat exchanger with heavy scale deposits inhibits formation of further deposits, promotes flaking of existing deposits, inhibits chemical corrosion and controls algae and bacteria.

6 Claims, 1 Drawing Figure

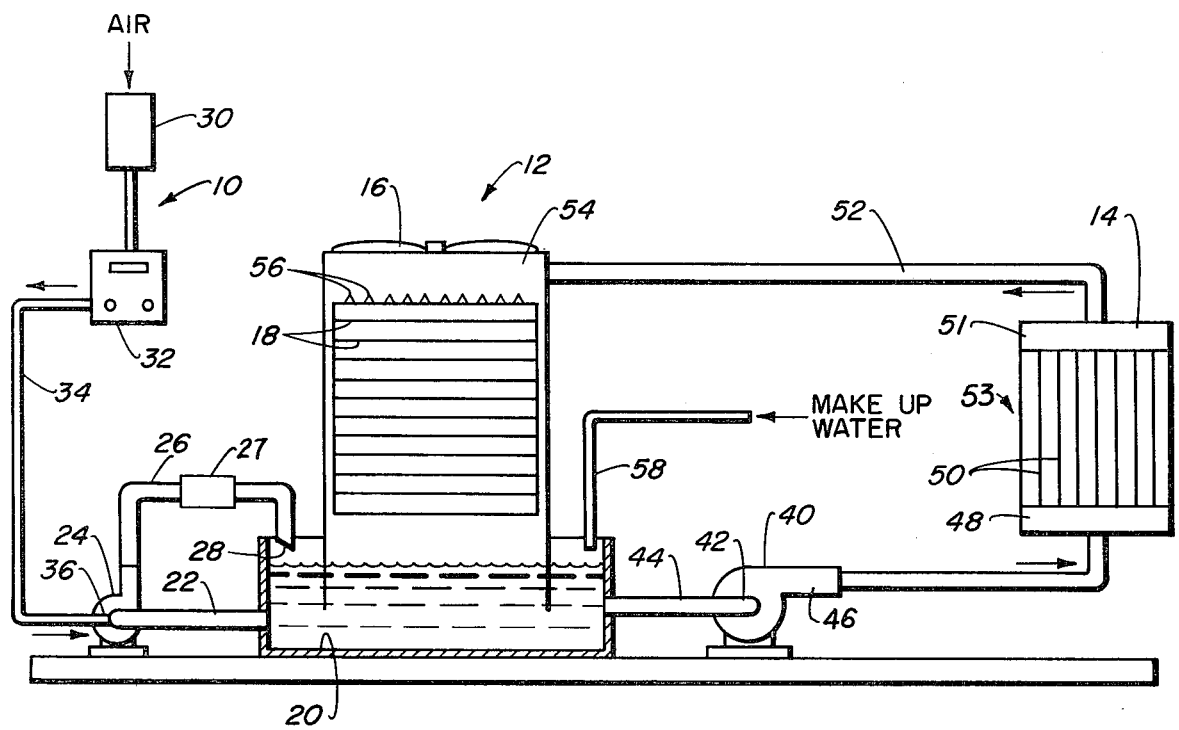
Figure

OZONATION OF COOLING TOWER WATERS

ORIGIN OF THE INVENTION

The invention described herein was made in the performance of work under a NASA contract and is subject to the provisions of Section 305 of the National Aeronautics and Space Act of 1958, Public Law 83-568 (72 Stat. 435; 42 USC 2457).

BACKGROUND OF THE INVENTION

1. Field of the Invention

The present invention relates to scale, corrosion and algae control in cooling towers and, more particularly, to a system and method of continuously treating cooling tower waters.

2. Description of the Prior Art

Water is the closest thing to a universal solvent known. In its pure condition (without dissolved materials) it is very corrosive. Most normally used industrial metals will gradually corrode or dissolve in distilled water. Some of the dissolved materials, like carbon dioxide, make water even more aggressive, both to metals and to non-metals. This solvent, water, which is a universal (and cheap) heat transfer medium, has a specific heat of 1 Btu/lb/°F. Water with its tremendous capacity to absorb and store heat, can absorb 33 times more heat than lead and 10 times more than iron.

All water utilized as the heat transfer medium in cooling towers has traditionally required some form of treatment. In the past chromium salts, generally in an acid condition, have been extensively used. Cooling tower water treatment implies that the waters are passivated in such a way that the following major problems do not develop or are greatly reduced:

(1) Scale build-up to the point of equipment or function failure.
(2) Corrosion of metals or degradation of wood to the point of function failure.
(3) Biological contamination to the point of function failure.

Airborne particles carry with them microorganisms which, after coming in contact with the cooling water, are distributed throughout the cooling water system to form algae, slime, and bacterial growths. Algae growth can accumulate to the point at which it interferes with the water flow in the cooling system. Slime in condensers restricts the water flow and acts as an insulator reducing the cooling capacity. This results in higher head pressures and increased load on circulating pump motors with corresponding increases in power consumption. Accumulations of organic matter can cause localized corrosive attack, resulting in premature equipment failure. Fungus action can cause wood destruction in towers.

These growths have been controlled with ozone. The ozone is dissolved in the cooling water where it attacks the bacteria and microorganisms and destroys them by oxidation. However, the ozone level is very low of the order of 0.2 mg/l of ozone and the ozone has always been used in conjunction with other chemical agents or electrochemical or electromechanical controls.

Corrosion is a destructive attack on metals which may be chemical or electrochemical in nature. Direct chemical corrosion is limited to unusual conditions involving highly corrosive environments or high temperature or both. Examples are metals in contact with acids or alkalies. However, a large part of the phenomena involving the corrosion of metals submerged in water, is electrochemical in nature. In cooling water systems, electrolytes are always present—namely ions dissolved in the water. Electrodes (anode and cathode) are also present. These electrodes may be two different metals, such as copper condenser tubes and steel condenser heads of the shell, or different areas of the same metal. In dissimilar metal corrosion, the less noble metal (anode) through corrosion will proceed to the more noble metal (cathode) (called galvanic corrosion). Corrosion of the same metal surface occurs if a difference in potential exists between two areas of the metal. One will act as the anode and the other as the cathode. Disintegration of metal will occur only at the anode. However, anode and cathode areas may shift periodically, resulting in uniform corrosion instead of pitting.

Past use of the chromium treatment did little to prevent biological problems from developing in cooling towers; however, as an inhibitor, it was very effective (and cheap) in protecting metals from corrosion. The acid condition of the treatment was also conducive to a reduced tendency for biological growth or scale development. Recent restrictions by the Environmental Protection Agency (EPA), on the use of chromium materials has made the search for alternative treatment materials necessary.

While the combined acid chromate treatment has long been the dominant technique for treating cooling tower waters, the non-chromate alkaline treatments are gaining popularity (by necessity). In some ways the modern alkaline type treatment resembles that which previously was known as the threshold treatment. This was a use condition where polyphosphates and selected organic materials were used in relatively low concentrations (threshold limit) to produce a partial sequestration of the calcium carbonates. Scale forming materials were prevented from giving hard scales, but they did allow a soft mud to accumulate in the reservoirs of the system. The new formulations that are being offered for this purpose are more sophisticated and higher in costs. They require much more supervision, monitoring, and control.

SUMMARY OF THE INVENTION

It has now been discovered that the maintenance of high levels of ozone in the cooling water in absence of any other chemical treating agents or electrochemical or electromechanical apparatus prevents further scale formation, removes existing scale, passivates the metal surfaces to inhibit further corrosion and at the same time is an active biocidal agent which fully disinfects the water to prevent algae growth. The ozone is injected into the cooling water and maintained above a minimum level of 2 mg/l up to about 20 mg/l. The ozone is usually provided by subjecting oxygen or air to a corona discharge. Ozonated air appears to provide enhanced flaking of scale probably due to disinfecting of the biological slimes and/or adhesives that cause adherence of the scale materials. Thus, there is no need to add chemical corrosion inhibitors nor biocides or other algae control agents.

These and many other attendant advantages of the invention will become readily apparent as the invention becomes better understood by reference to the following detailed description when considered in conjunction with the accompanying drawings.

BRIEF DESCRIPTION OF THE DRAWING

The FIGURE is a block schematic view of a cooling water treatment system according to this invention.

DESCRIPTION OF THE PREFERRED EMBODIMENTS

The system of the invention generally includes an ozone generating and injection section 10, a cooling tower 12 and heat exchanger 14. The cooling tower 12 operates by the latent heat of evaporation of air and can be an atmospheric type or the mechanical draft type in which a fan 16 is utilized to blow air through water falling downwardly through grids and slats 18 into a basin 20. The cooled water in basin 20 is ozonated by recirculating a portion of the water through a circuit containing an outlet conduit 22 connected to the inlet side of ozone injection pump 24 and a recycle conduit 26 through a sludge filter 27 connected to the outlet side of the pump and terminating in a nozzle end 28 discharging into the basin 20 or by direct injection into the low pressure side of the recirculation pump 40.

Ozone is generated from a gas such as air or oxygen which is preferably dried in a column 30 containing a dessicant such as silica gel or by refrigeration to the dew point of the air since humidity in the air reduces ozone production. The dried air is delivered to an ozone generator 32. The ozone generator can be a commercial state of the art corona-discharge-type ozone generator. The output 34 from the generator is introduced at the suction side 36 of the circulating pump 24 or 40. The turbulence within the pump thoroughly mixes the ozone and dissolves it in the water. Oxidation of organic impurities begins immediately. By the time the ozonated water reaches the basin sump 20, most of the microorganism kill has been accomplished. The remainder of the dissolved ozone remains in the basin water and travels through the cooling circuit where it passivates metal surfaces, attacks slime or other bacterial deposits and prevents and removes scale.

The cooling circuit includes a separate circulating pump 40 having its inlet side 42 connected to the basin through conduit 44 and its output side 46 connected to the inlet side of the heat exchanger 53. The ozonated cooling water is distributed by means of header 48 into the tubes 50, collects in header 51 and flows through conduit 52 to the main header 54 of the spray tower 12 where it is distributed to various nozzles 56 and sprayed upwardly to mix with the air from fan 16 before dropping to the slats and grids 18 below. Make-up water 58 is added to the basin 20 as needed to compensate for losses in the system.

Testing of the system was performed in a commercial size (678 gallon) forced air cooling tower used for space cooling and attached to a large heat exchanger. The water compositions are presented in the following table.

TABLE I

| Property | Av Soft ppm | Av Hard ppm |
|---|---|---|
| $Ca^{++}$ | 45 | 120 |
| Chloride | 15 | 900 |
| Total Dissolved Solids (TDS) | 280 | 1780 |
| Total Hardness (as $Ca^{++}$) | 65 | 300 |
| Iron | 0.02 | — |
| Alkalinity (as $CaCO_3$) | 30/180 | 80/560 |
| pH | 7.0–7.9 | 8.2–8.9 |
| Conductivity (micro mhos/cm) | 160 | 1800 |
| Langelier Index | +0.51 | +2.72 |

The soft water is primarily well water as received and was concentrated to form hard water by operating the cooling tower without blowdown.

As shown in the FIGURE, the cooling tower was fitted with a commercial corona-discharge-type ozone generator. Inlet air to the ozone generator was desiccant dried producing one liter/hour of air containing 3% ozone.

Algae growth at the time of installation of the ozone system was extensive. Heavy scale deposits were on the cooling tower slats. Photographs were taken of the opened heat exchanger tube bundles. An analysis of the deposits indicated principally calcium carbonate with a small amount of iron oxide present. Steel and copper corrosion coupons were placed in the water recirculation line. Operation of the cooling tower with the ozonator producing a steady stream of ozone being injected into the cooling tower water lasted 1080 hours. The water temperature from the high temperature heat exchanger varied according to the heating load but was generally from 70° F. to 85° F. During this period of operation (with no blow down), the total solids reached 1700 mg/l and the water hardness reached 724 mg/l (as $CaCO_3$). Water in the tower became crystal clear, the algae disappeared, and scale started flaking off the slats.

Corrosion rates for the metal coupons were very low during the ozonation run. (Copper was 0.06 mils/year and steel was 1.86 mils/year.) Photographs taken of the heat exchanger tubes showed that the calcium scale previously on the tubes had decreased. It is not known by what mechanism the results can be attributed. It is possible that, since air was used for generation of the ozone, some nitrogen was also fixed producing a dilute nitric acid in the water and forming calcium nitrate with the scale. The actual concentration of nitrate increased in the tower water 51 times (from 3.2 mg/l to 164 mg/l). It is also possible that the dissolved ozone in the water reversed the calcium carbonate equilibrium toward the formation of the bicarbonate salt. Calcium bicarbonate is 10,000 times more soluble in water than the carbonate. Also, by allowing the salinity to increase (no blowdown), the solubility of calcium carbonate is increased. For instance in sea water, calcium carbonate is 500 times more soluble than in fresh water.

The metal parts of the cooling system are protected by a continuous and adherent coating of metal oxide which forms almost instantaneously when exposed to ozonated water.

It is to be realized that only preferred embodiments of the invention have been described and that numerous substitutions, modifications and alterations are permissible without departing from the spirit and scope of the invention as defined in the following claims.

What is claimed is:

1. A method of inhibiting formation of scale, corrosion and algae growth on the surfaces in contact with corrosive and scaling ion containing water circulating through a circuit including a heat exchanger and a cooling tower in which air containing algae forming microorganisms is blown through water downwardly falling into a basin comprising the steps of:

injecting ozone into the water in the basin at a level of at least 2 milligrams per liter in the absence of any other corrosion or scale inhibitor; and maintaining the ozone level in the water in the circuit at a level between 2 to 20 milligrams per liter.

2. A method according to claim 1 in which the ozone is generated by subjecting an oxygen containing gas to a corona discharge.

3. A method according to claim 2 in which the gas is air.

4. A method according to claim 3 in which the air is dried before being ozonated.

5. A method according to claim 3 in which the scale comprises calcium carbonate and further including the step of flaking the scale from the surfaces.

6. A method according to claim 1 in which the scale comprises calcium carbonate.

* * * * *